US009400939B2

(12) United States Patent
Lin et al.

(10) Patent No.: US 9,400,939 B2
(45) Date of Patent: Jul. 26, 2016

(54) SYSTEM AND METHOD FOR RELATING CORRESPONDING POINTS IN IMAGES WITH DIFFERENT VIEWING ANGLES (71) Applicant: International Business Machines Corporation, Armonk, NY (US)

(72) Inventors: Chung-Ching Lin, White Plains, NY (US); Sharathchandra U. Pankanti, Darien, CT (US); John R. Smith, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 14/251,636

(22) Filed: Apr. 13, 2014

(65) Prior Publication Data

US 2015/0294490 A1 Oct. 15, 2015

(51) Int. Cl.
*G06K 9/46* (2006.01)
*G06T 3/40* (2006.01)
*G06K 9/62* (2006.01)
*G06T 7/40* (2006.01)
*G06K 9/52* (2006.01)

(52) U.S. Cl.
CPC ............... *G06K 9/4671* (2013.01); *G06K 9/52* (2013.01); *G06K 9/6203* (2013.01); *G06T 3/4038* (2013.01); *G06T 7/40* (2013.01); *G06T 7/408* (2013.01); *G06T 2200/32* (2013.01)

(58) Field of Classification Search
None
See application file for complete search history.

(56) References Cited

U.S. PATENT DOCUMENTS

| 5,720,021 | A | * | 2/1998 | Murata | ..................... G06T 1/60 345/581 |
| 7,382,897 | B2 | | 6/2008 | Brown et al. | |
| 7,596,281 | B2 | * | 9/2009 | Irani | ..................... G06T 7/0038 382/276 |
| 7,664,314 | B2 | | 2/2010 | Stein | |

(Continued)

OTHER PUBLICATIONS

Lingua, Andrea, Davide Marenchino, and Francesco Nex. "Performance analysis of the SIFT operator for automatic feature extraction and matching in photogrammetric applications." Sensors 9.5 (2009): 3745-3766.

*Primary Examiner* — Kim Vu
*Assistant Examiner* — Nathan Bloom
(74) *Attorney, Agent, or Firm* — Ido Tuchman; Nidhi G. Kissoon (57) ABSTRACT

A system, method and computer program product for relating corresponding points in images with an overlapping scene. An example method includes generating transformed images of a target image using different image transformations for each of transformed images. Texture descriptors are extracted for feature points in the transformed images and a reference image. Matched feature points are identified and inliers from matched feature points are selected. An aligning transformation is generated using the inliers for at least one of the transformed images. A panorama image is created with the target image and reference image after the images are aligned.

20 Claims, 6 Drawing Sheets (56) References Cited

U.S. PATENT DOCUMENTS

| | | |
|---|---|---|
| 8,098,938 B1 | 1/2012 | Buddemeier et al. |
| 8,260,006 B1 | 9/2012 | Callari et al. |
| 8,340,400 B2 | 12/2012 | Lukas et al. |
| 8,417,060 B2 | 4/2013 | Abousleman et al. |
| 8,699,819 B1* | 4/2014 | Ziegler ................. G06K 9/6201 358/497 |
| 2008/0013836 A1* | 1/2008 | Nakamura ........... G06K 9/4642 382/209 |
| 2011/0090337 A1 | 4/2011 | Klomp et al. |
| 2011/0153206 A1* | 6/2011 | Kotaba ................... G01C 21/00 701/532 |
| 2012/0201466 A1 | 8/2012 | Funayama et al. |
| 2012/0219188 A1 | 8/2012 | Kurz et al. |
| 2012/0300020 A1* | 11/2012 | Arth ....................... G06T 7/0046 348/36 |
| 2013/0022233 A1* | 1/2013 | Ma ........................... G01S 5/16 382/103 |
| 2013/0060766 A1* | 3/2013 | Lin ................... G06F 17/30259 707/723 |
| 2015/0131909 A1* | 5/2015 | Muninder ............ G06T 3/4038 382/192 |

\* cited by examiner

SYSTEM AND METHOD FOR RELATING CORRESPONDING POINTS IN IMAGES WITH DIFFERENT VIEWING ANGLES

BACKGROUND

The present invention relates to image processing and, more specifically, to determining corresponding points in a plurality of images with an overlapping scene.

Relating one camera view to another view of scene or object is an important component in many visual analytic business problems. For example, creating a panoramic view of the multiple cameras on an aerial vehicle is often of useful for many applications including defense, surveillance, and asset management.

Typically, information about the camera position and orientation is not carried with camera images. Thus, it is often difficult to stitch together images of overlapping scenes to create an overall view when the camera position and orientation changes over time.

BRIEF SUMMARY

Accordingly, one example aspect of the present invention is a method for relating corresponding points in a plurality of images with an overlapping scene. The method includes receiving a first image and a second image. A detecting step detects first feature points for the first image. An extracting step extracts first texture descriptors from the first feature points. A generating step generates a plurality of transformed images of the second image using different image transformations for each of transformed images. A detecting step detects second feature points for each of the transformed images. A further extracting step extracts second texture descriptors from each of the transformed images. A determining step determines a texture similarity between the first texture descriptors from the first image and the second texture descriptors from each of the transformed images. An identifying step identifies matched feature points from the first image and each of the transformed images with an associated texture similarity above a similarity threshold. A selecting step selects the largest set of inliers from matched feature points. The inliers are matched feature points that fit the model with the distance less than a threshold. A generating step then generates an aligning transformation using the inliers. An aligning step aligns the first image and the second image using the aligning transformation. The transformed second image is the second image transformed to the coordinate system of the first image. A creating step creates a panorama image with the first image and the transformed second image after the first image and the transformed second image are aligned.

Another example aspect of the present invention is a system for relating corresponding points in a plurality of images with an overlapping scene. The system includes a first image, a second image, and a computer processor. The computer processor is configured to detect first feature points for the first image; extract first texture descriptors from the first feature points; generate a plurality of transformed images of the second image using different image transformations for each of transformed images; detect second feature points for each of the transformed images; extract second texture descriptors from each of the transformed images; determine a texture similarity between the first texture descriptors from the first image and the second texture descriptors from each of the transformed images; identify matched feature points from the first image and each of the transformed images with an associated texture similarity above a similarity threshold; select inliers from matched feature points (the inliers are matched feature points that fit a model with a distance less than a distance threshold); generate a transformed matched image that is the matched image transformed to the coordinate system of the first image; and align the first image and the transformed matched image(s) using the aligning transformation such that the second image is transformed to the coordinate system of the first image. The system further includes a panorama image with the first image and the transformed matched image after the first image and the transformed matched image are aligned.

Yet another example aspect of the present invention is a computer program product for relating corresponding points in a plurality of images with an overlapping scene. The computer program product includes program code configured to: receive a first image and a second image; detect first feature points for the first image; extract first texture descriptors from the first feature points; generate a plurality of transformed images of the second image using different image transformations for each of transformed images; detect second feature points for each of the transformed images; extract second texture descriptors from each of the transformed images; determine a texture similarity between the first texture descriptors from the first image and the second texture descriptors from each of the transformed images; identify matched feature points from the first image and each of the transformed images with an associated texture similarity above a similarity threshold; select a matched image from the plurality of transformed images having a highest number of matched feature points above a match number threshold; generate a transformed matched image that is the matched image transformed to the coordinate system of the first image; align the first image and the transformed matched image using the matched first feature points and second feature points; and create a panorama image with the first image and the transformed matched image after the first image and the transformed matched image are aligned.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention reference is made to FIGS. 1-4C. When referring to the figures, like structures and elements shown throughout are indicated with like reference numerals.

Embodiments of the present invention can register images with different viewing angles. The techniques herein can be applied on creating panorama for different type of moving camera, such as, unmanned aerial vehicle (UAV) cameras, wearable cameras, and cell phone cameras. For example, a UAV can change viewing angle, zoom, and other camera settings. The change in viewing angle from different video segments could be significant. When registering images in this situation, the 3-D distortion can cause the same corresponded points in different views to no longer extract similar affine invariant descriptors. The existing methods often fail to find corresponded points.

To overcome prior approaches, techniques herein normalize 3-D distortion by making a hypothesis transformation and finding the accurate corresponding points. In one embodiment, affine transformations are sufficient to normalize 3-D distortion.

Figure 1:
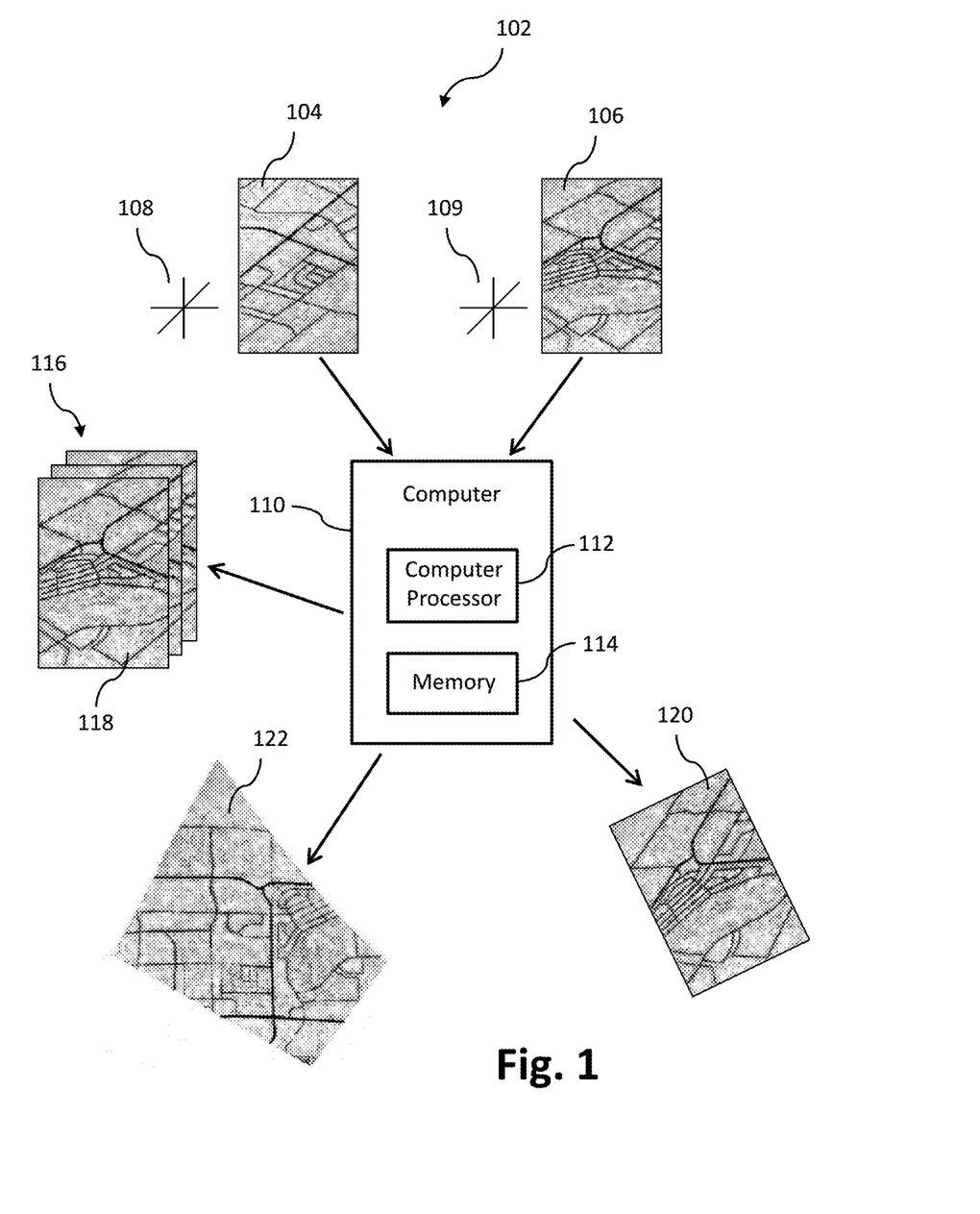
FIG. 1 shows an example system contemplated by the present invention for relating corresponding points in a plurality of images with an overlapping scene.

FIG. 1 shows an example system 102 contemplated by the present invention for relating corresponding points in a plurality of images with an overlapping scene. The system includes a first image 104 and a second image 106. It is noted that the first image and the second image may be part of a video stream. The first image is associated to a first coordinate system 108 and the second image is associated to a second coordinate system 109.

The system 102 further includes at least one computer 110. Some elements of the computer 110 can include a computer processor 112 (as referred to as a central processing unit) and non-transitory memory 114, such as Random Access Memory (RAM), Read Only Memory (ROM), and Flash memory. The memory 114 generally stores program instructions and data used by the computer processor 112. The computer 110 may include various I/O devices, such as secondary memory, a keyboard, a mouse, network adaptor, a display adapter, a monitor and a printer.

As described in detail below, the computer processor 112 is configured to detect first feature points for the first image and extract first texture descriptors from the first feature points. Next, the computer processor 112 generates a plurality of transformed images 116 of the second image 106 using different image transformations for each of transformed images. In one embodiment, the image transformations are rigid transformations, such as affine transformations. The computer processor 112 detects second feature points for each of the transformed images and extracts second texture descriptors from each of the transformed images 116.

A texture similarity between the first texture descriptors from the first image 104 and the second texture descriptors from each of the transformed images is determined by the computer processor 112. The computer processor 112 then determines matched feature points having a texture similarity above a similarity threshold. Inliers from matched feature points are selected, with the inliers being matched feature points that fit a model with a distance less than a distance threshold. A matched image 118 may be selected from the plurality of transformed images 116 having a highest number of matched feature points above a match number threshold.

The computer processor 112 generates an aligning transformation using the inliers for at least one of the transformed images. An aligning operation aligns the first image and one or more of the transformed images using the aligning transformation. Thus, the second image 106 is transformed to the first coordinate system 108 of the first image. A transformed image 120 is thus generated by the computer processor 112. A panorama image 122 is created with the first image 104 and the transformed image 120 after the first image 104 and the transformed image 120 are aligned.

Accordingly, the present invention may be used to register and align two images with large different viewing angle. One is reference image (also referred to a first image), and the other is target image (also referred to a second image). Each image might be taken in a different setting.

Figure 2A:
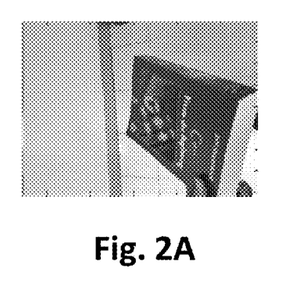
FIG. 2A shows an example reference image.
Figure 2B:
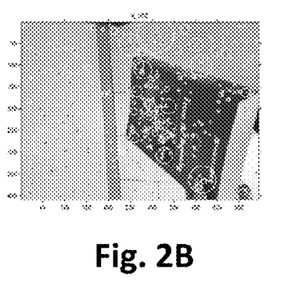
FIG. 2B shows detected feature points of the reference image using SIFT.

In one embodiment, the image color is first normalized using, for example, the well-known Gray World technique. From the reference image, the feature points are detected and then the texture descriptors are extracted. Various methods known to those skilled in the art can be used to detect feature points and extract texture descriptors, such as, but not limited to, Scale-Invariant Feature Transform (SIFT) and Speeded Up Robust Features (SURF). See, Herbert Bay, Andreas Ess, Tinne Tuytelaars, Luc Van Gool, "Speeded-Up Robust Features (SURF), Computer Vision and Image Understanding", vol. 110, no. 3, pp. 346-359, June, 2008, incorporated herein in its entirety. For example, FIG. 2A shows a reference image and FIG. 2B shows detected feature points of the reference image using SIFT.

Figure 2C:
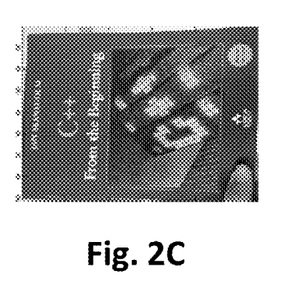
FIG. 2C shows a target image.
Figure 2D:
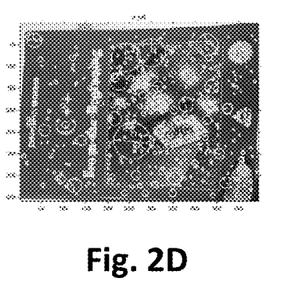
FIG. 2D shows detected feature points of the target image using SIFT.

To compensate the 3-D distortion, the target image is transformed with the multiple hypothesis transformations. Feature points are then detected and texture descriptors are extracted from the transformed target image. For example, FIG. 2C shows a target image and FIG. 2D shows detected feature points of the target image using SIFT.

There are potentially an infinite number of possible hypotheses. In one embodiment, a set of quantized affine transformations are used for compensating the 3-D distortion. The affine transformation may be:

$$\begin{bmatrix} x' \\ y' \\ 1 \end{bmatrix} = H \begin{bmatrix} x \\ y \\ 1 \end{bmatrix}$$

$$H = \begin{bmatrix} s & m_x & 0 \\ m_y & s & 0 \\ 0 & 0 & 1 \end{bmatrix}$$

where [x, y] are the pixel position, s is scale factor, $m_x$ is shear factor of x axis, and $m_y$ is shear factor of y axis. For example, an image transformation may be:

$$s = [s_1, s_2, \ldots, s_n]$$

$$m_x = [m_{x1}, m_{x2}, \ldots, m_{xk}]$$

$$m_y = [m_{y1}, m_{y2}, \ldots, m_{yh}]$$

The scale factor is to deal with images taken in large zoom difference. The shear factors are to deal with images acquired with large 3-D distortion. Each combination of s, $m_x$, and $m_y$ is a hypothesis.

This transformation can make the transformed pixels have negative coordinates. Before transforming, we calculate the coordinate range of transformed image. If the transformed pixels have negative coordinates, translation factors are applied to make sure all the pixels have positive coordinates. The affine transformation becomes:

$$H = \begin{bmatrix} s & mx & t_x \\ my & s & t_y \\ 0 & 0 & 1 \end{bmatrix}$$

where $t_x$ is translational factor of x axis and $t_y$ is translational factor of y axis.

$$t_x = \begin{cases} 0, & \text{if } \min_x \geq 0 \\ -\min_x, & \text{if } \min_x < 0 \end{cases}$$

$$t_y = \begin{cases} 0, & \text{if } \min_y \geq 0 \\ -\min_y, & \text{if } \min_y < 0 \end{cases}$$

where $\min_x$ is the smallest x coordinate, and $\min_y$ is the smallest y coordinate. The updated transformation is used to transform the target image.

In one embodiment, descriptors extracted from the reference image and from transformed target image are matched using the ratio of similarity to the first nearest neighbor and similarity to the second nearest neighbor. When the ratio is bigger than a threshold, the feature point with the closest descriptor is taken as a matched feature point. In order to get more robust results, bidirectional matching is performed as follows:

1. match descriptors from reference image to descriptors from transformed target image, and
2. match descriptors from transformed target image to descriptors from reference image.

Figure 3A:
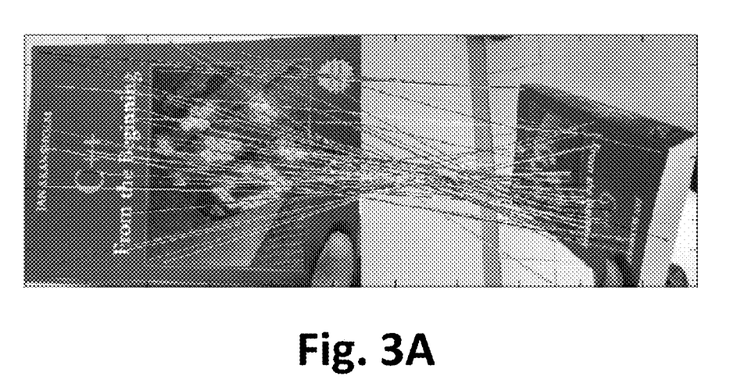
FIG. 3A shows matched feature points having a texture similarity between first texture descriptors from the reference image and second texture descriptors from the transformed target image above a similarity threshold.

If we can find more than one point matches in both directional matching, the point matches are considered valid. FIG. 3A illustrates matched feature points having a texture similarity between first texture descriptors from the reference image and second texture descriptors from the transformed target image above a similarity threshold.

In one embodiment, the coordinate of matched points are transformed back to original coordinate system of target image using the updated hypotheses and the transformed point matches are saved. Otherwise, the matching result is discarded.

Figure 3B:
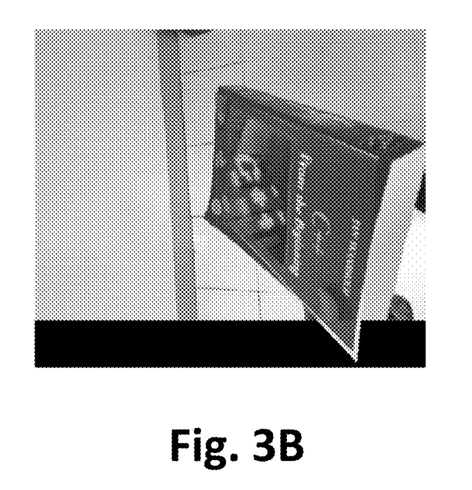
FIG. 3B shows an example panorama image created after the reference image and the transformed matched image are aligned.

This transform-detect-match procedure is performed for each hypothesis. The valid point matches are accumulated and, after all the iterations, all the point matches are inspected. The redundant point matches are removed. In one embodiment, RANSAC (RANdom SAmple Consensus) is used to determine which point matches are inliers. The inliers are matched feature points that fit the model with the distance less than a threshold. The inlier point matches are used to calculate the transformation between two images. With the transformation, the images are aligned to have the same coordinate system and the panorama image is created. FIG. 3B shows an example panorama image created after the reference image and the transformed target or matched image are aligned.

Figure 4A:
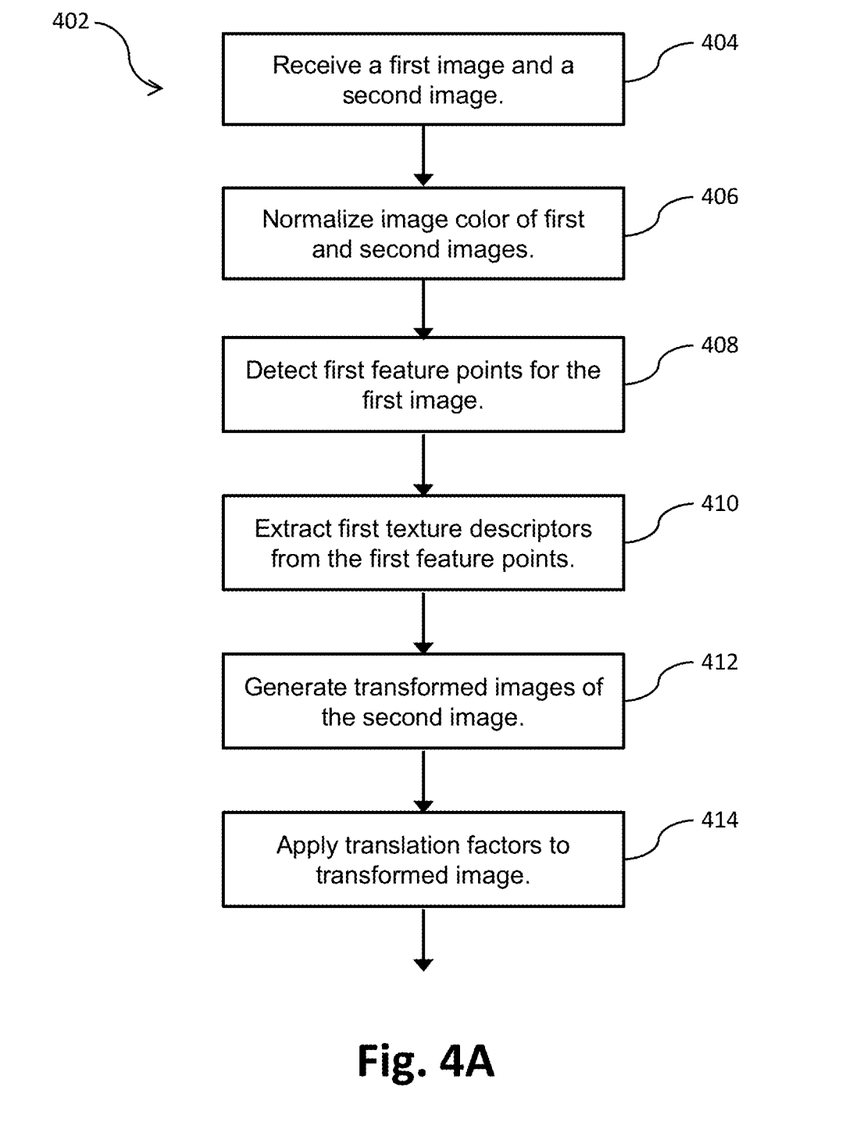
FIGS. 4A-C show an example method for relating corresponding points in a plurality of images with an overlapping scene contemplated by the present invention.
Figure 4B:
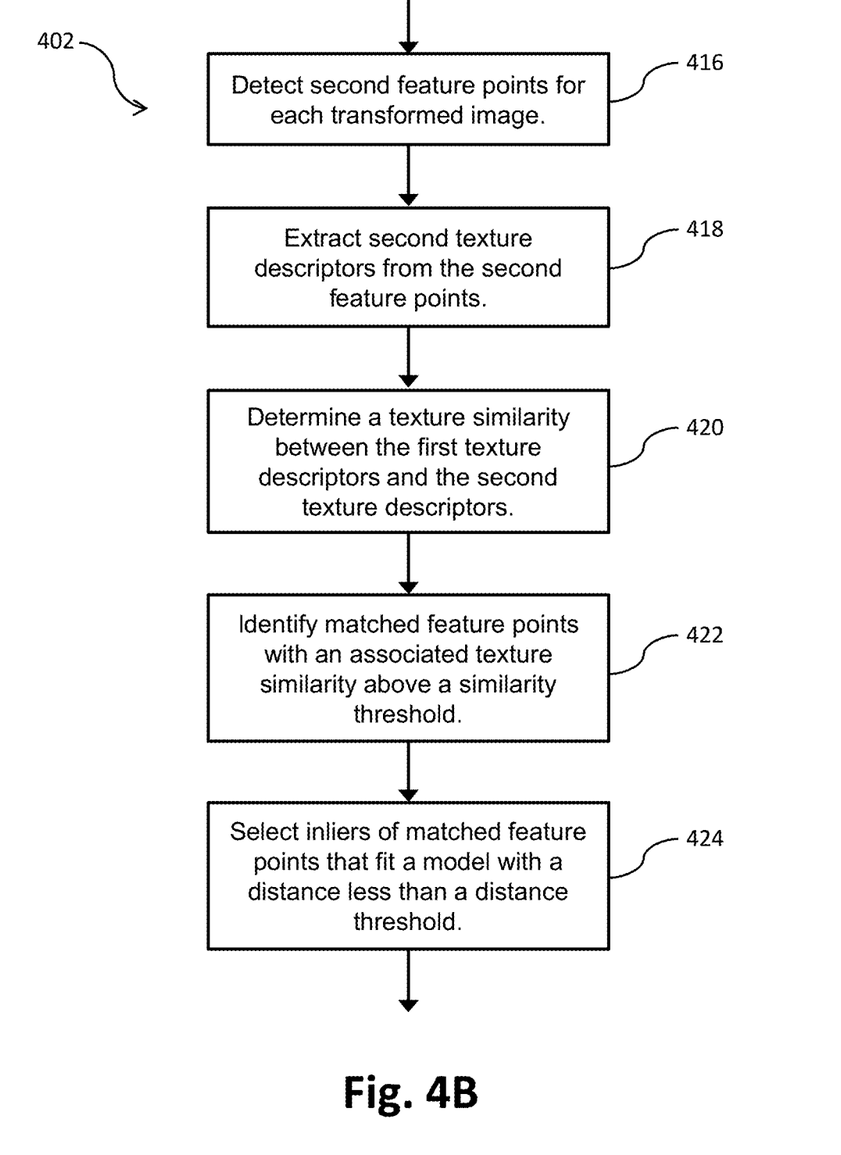
Figure 4C:
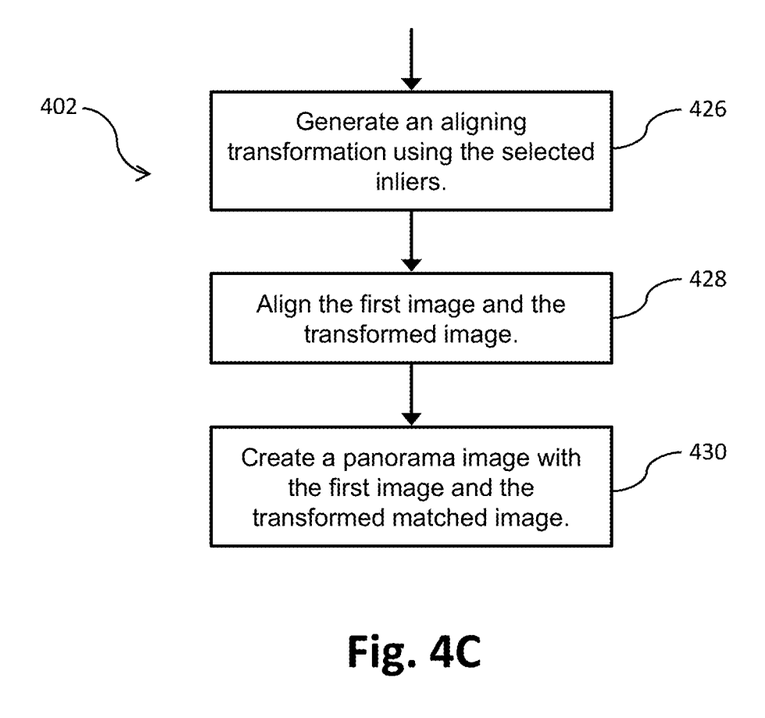

FIGS. 4A-C show an example method 402 for relating corresponding points in a plurality of images with an overlapping scene contemplated by the present invention. A receiving operation 404 receives a first image and a second image. The first image has a coordinate system. After receiving operation 404 is completed, control passes to normalizing operation 406.

Normalizing operation 406 is used to normalize image color in the first image and the second image. It is contemplated that in some embodiments normalizing operation 406 is not performed. After normalizing operation 406 is completed, control passes to detecting operation 408.

Detecting operation 408 detects first feature points for the first image. As mentioned above, detecting feature points in images may be performed using a Scale-Invariant Feature Transform (SIFT) algorithm. It is noted that embodiments of the present invention may employ other algorithms to detect feature points. For example, the feature points may be corner edges in the image where two lines meet with high contrast features. Additional information about detecting feature points can be found at D. G. Lowe, "Distinctive image features from scale-invariant keypoints", International Journal of Computer Vision, 60(2):91-110, 2004, incorporated herein in its entirety. After detecting operation 408 is completed, control passes to extracting operation 410.

At extracting operation 410, first texture descriptors are extracted from the first feature points. In one embodiment of the present invention, texture descriptors are extracted from feature points using various metrics to construct a feature vector. These features may include, for example, color, granularity, and neighboring pixels. Various methods known to those skilled in the art can be used to extract descriptors, such as, but not limited to Histogram of Oriented Gradient (HoG) from SIFT. After extracting operation 410 is completed, control passes to generating operation 412.

At generating operation 412, a plurality of transformed images of the second image is generated using different image transformations for each of transformed images. The image transformations may include, for example, image rotating, image stretching, image skewing, image scaling, and other geometric transforms. As discussed above, in one embodiment, generating the plurality of transformed images of the second image includes performing a set of quantized affine transformations of the second image.

As mentioned above, some of the transformed images of the second image may result in transformed pixels having negative coordinates. Thus, the process may include a calculating and applying operation 414 to ensure all pixels in the transformed images have positive coordinates. The calculating and applying operation 414 includes calculating a coordinate range of the transformed image before generating the transformed image and applying translation factors so that all pixels in the transformed image have positive coordinates if pixels in the transformed images have negative coordinates.

Next, at detecting operation 416, second feature points for each of the transformed images are detected. That is, a set of feature points are detected for each transformed image. It is contemplated that detecting operation 416 can be performed sequentially (one by one) for each transformed image, or the detecting operation 416 can be performed in parallel for transformed images. As mentioned above, detecting feature points in images may be performed using, for example, a Speeded Up Robust Features (SURF) algorithm. After detecting operation 416 is completed, control passes to extracting operation 418.

At extracting operation 418, second texture descriptors are extracted from the second feature points. Thus, each transformed image is associated with its own set of second texture descriptors based on its own set of second feature points. As mentioned above, texture descriptors may be extracted using, for example, HoG from SIFT. After extracting operation 418 is completed, control passes to determining operation 420.

At determining operation 420, a texture similarity between the first texture descriptors from the first image and the second texture descriptors from each of the transformed images is determined to find corresponding points. More specifically, each first texture descriptor for the first image is paired with and compared to each second texture descriptor in each of the transformed image. A texture similarity is calculated for each texture descriptor pair.

In one embodiment, descriptors extracted from the reference image and from transformed target image are matched using the ratio of nearest neighbor to second-nearest neighbor of each descriptor. Determining operation 420 may include performing bidirectional matching. In this embodiment, the first texture descriptors from the first image are matched to the second texture descriptors from each of the transformed images, and the second texture descriptors from each of the transformed images are matched to the first texture descriptors from the first image. After determining operation 420 is completed, control passes to identifying operation 422.

At identifying operation 422, matched feature points from the first image and each of the transformed images with an associated texture similarity above a similarity threshold are identified. Thus, each of the transformed images includes a set of zero or more matched feature points having an associated texture similarity calculated in determining operation 420 that is above a similarity threshold. After identifying operation 422 is completed, control passes to selecting operation 424.

At selecting operation 424, inliers of matched feature points are selected that fit a model with a distance less than a distance threshold using, for example, RANSAC. See, for example, Martin A. Fischler, Robert C. Bolles, "Random sample consensus: a paradigm for model fitting with applications to image analysis and automated cartography", Communications of the ACM, vol. 24, no. 6, pp. 381-395, June 1981, incorporated herein in its entirety. In a further embodiment, a matched image from the plurality of transformed images is selected. The matched image has the highest number of matched feature points above a match number threshold. If no transformed image has matched feature points above the match number threshold, the method returns an indication that no match was found and ends. After selecting operation 424 is completed, control passes to generating operation 426.

At generating operation 426, an aligning transformation is generated using the selected inliers. After generating operation 426 is completed, control passes to aligning operation 428.

At aligning operation 428, the first image and the transformed image are aligned using the aligning transformation such that the second image is transformed to the coordinate system to the first image. The aligning operation is to transform the second image using the aligning transformation generated by using inliers of matched feature points. The aligning transformation can transform the coordinate of the second image to the coordinate system of the first image. After aligning operation 428 is completed, control passes to creating operation 430.

At creating operation 430, a panorama image is created with the first image and the second image after the first image and the second image are aligned. After creating operation 430 is completed the method ends.

Another embodiment of the present invention is a method for relating two or more view of a scene. The method includes extracting points of interest in each view to comprise of point set from each image view, extracting visual representation around spatio-temporal region at one or more points in each point set related in two or more images, making one or more point constellations from each point set by grouping one or more points from each point set in each selected view, hypothesizing relationship of the pairs of point constellations in the selected views in terms of a geometric transform, normalizing the representation of the points based on hypothesized transform, and validating the hypothesis by metric of similarity of normalized visual representations of the points. In one embodiment, the point representations are translational invariant representations of edge orientations. In another embodiment, the representations are SIFT points.

In a further embodiment of the present invention a procedure is proposed where, for the reference image, points and respective texture descriptors are found. Likewise, for the target image, points and respective texture descriptors are found. For each point in the target image, a transformation is hypothesized and the texture descriptors are transformed for the hypothesized transformation. For each pair of corresponding point hypothesis, the corresponding point descriptors are matched to obtain a score and the biggest matched score is retained for each reference point match. Point matches are discarded based on bi-directional matches. Point matches are also discarded based on in-line criteria. The non-discarded matches provide a correspondence solution and the underlying transformation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for relating corresponding points in a plurality of images with an overlapping scene, the method comprising:
   receiving a first image and a second image, the first image having a coordinate system;
   detecting first feature points for the first image;
   extracting first texture descriptors from the first feature points;
   generating a plurality of transformed images of the second image using different image transformations for each of transformed images;
   detecting second feature points for each of the transformed images;
   extracting second texture descriptors from each of the transformed images;
   determining a texture similarity between the first texture descriptors from the first image and the second texture descriptors from each of the transformed images;
   identifying matched feature points from the first image and each of the transformed images with an associated texture similarity above a similarity threshold;
   selecting inliers from matched feature points, the inliers are matched feature points that fit a model with a distance less than a distance threshold;
   generating an aligning transformation using the inliers for at least one of the transformed images;
   aligning the first image and the at least one of the transformed images using the aligning transformation such that the second image is transformed to the coordinate system to the first image; and
   creating a panorama image with the first image and the transformed second image after the first image and the second image are aligned.

2. The method of claim 1, further comprising selecting a matched image from the plurality of transformed images having a highest number of matched feature points above a match number threshold.

3. The method of claim 1, further comprising normalizing image color in the first image and the second image.

4. The method of claim 1, wherein generating the plurality of transformed images of the second image includes performing a set of quantized affine transformations of the second image.

5. The method of claim 1, further comprising, for each of the transformed images:
   calculating a coordinate range of the transformed image before generating the transformed image; and
   applying translation factors so that all pixels in the transformed image have positive coordinates if pixels in the transformed images have negative coordinates.

6. The method of claim 1, wherein determining the texture similarity between the first texture descriptors from the first image and the second texture descriptors from each of the transformed images includes performing bidirectional matching where the first texture descriptors from the first image are matched to the second texture descriptors from each of the transformed images, and the second texture descriptors from each of the transformed images are matched to the first texture descriptors from the first image.

7. The method of claim 1, wherein detecting the first feature points and detecting the second feature points is performed using a Scale-Invariant Feature Transform (SIFT) algorithm.

8. The method of claim 1, wherein detecting the first feature points and detecting the second feature points is performed using a Speeded Up Robust Features (SURF) algorithm.

9. A system for relating corresponding points in a plurality of images with an overlapping scene, the system comprising:
   a first image having a coordinate system;
   a second image;
   a computer processor configured to:
      detect first feature points for the first image;
      extract first texture descriptors from the first feature points;
      generate a plurality of transformed images of the second image using different image transformations for each of transformed images;
      detect second feature points for each of the transformed images;
      extract second texture descriptors from each of the transformed images;
      determine a texture similarity between the first texture descriptors from the first image and the second texture descriptors from each of the transformed images;
      identify matched feature points from the first image and each of the transformed images with an associated texture similarity above a similarity threshold;
      select inliers from matched feature points, the inliers are matched feature points that fit a model with a distance less than a distance threshold;
      generate an aligning transformation using the inliers for at least one of the transformed images; and
      align the first image and the at least one of the transformed images using the aligning transformation such that the second image is transformed to the coordinate system of the first image; and
   a panorama image with the first image and the second image after the first image and the second image are aligned.

10. The system of claim 9, wherein the computer processor is further configured to normalize image color in the first image and the second image.

11. The system of claim 9, wherein the computer processor is further configured to perform a set of quantized affine transformations of the second image.

12. The system of claim 9, wherein the computer processor is further configured to, for each of the transformed images:
   calculate a coordinate range of the transformed image before generating the transformed image; and
   apply translation factors so that all pixels in the transformed image have positive coordinates if pixels in the transformed images have negative coordinates.

13. The system of claim 9, wherein the computer processor is further configured to perform bidirectional matching where the first texture descriptors from the first image are matched to the second texture descriptors from each of the transformed images, and the second texture descriptors from each of the transformed images are matched to the first texture descriptors from the first image.

14. The system of claim 9, wherein the computer processor is further configured to use a Scale-Invariant Feature Transform (SIFT) algorithm in detecting the first feature points and detecting the second feature points.

15. A computer program product for relating corresponding points in a plurality of images with an overlapping scene, the computer program product comprising:
   a non-transitory computer readable storage medium having computer readable program code embodied therewith, the computer readable program code configured to:
   receive a first image and a second image, the first image having a coordinate system;
   detect first feature points for the first image;
   extract first texture descriptors from the first feature points;
   generate a plurality of transformed images of the second image using different image transformations for each of transformed images;
   detect second feature points for each of the transformed images;
   extract second texture descriptors from each of the transformed images;
   determine a texture similarity between the first texture descriptors from the first image and the second texture descriptors from each of the transformed images;
   identify matched feature points from the first image and each of the transformed images with an associated texture similarity above a similarity threshold;
   select inliers from matched feature points, the inliers are matched feature points that fit a model with a distance less than a distance threshold;
   generate an aligning transformation using the inliers for at least one of the transformed images;
   align the first image and the at least one of the transformed images using the aligning transformation such that the second image is transformed to the coordinate system of the first image; and
   create a panorama image with the first image and the second image after the first image and the second image are aligned.

16. The computer program product of claim 15, wherein the computer readable program code is further configured to normalize image color in the first image and the second image to grayscale.

17. The computer program product of claim 15, wherein the computer readable program code to generate the plurality of transformed images of the second image includes computer readable program code configured to perform a set of quantized affine transformations of the second image.

18. The computer program product of claim 15, wherein the computer readable program code is further configured to, for each of the transformed images:
   calculate a coordinate range of the transformed image before generating the transformed image; and
   apply translation factors so that all pixels in the transformed image have positive coordinates if pixels in the transformed images have negative coordinates.

19. The computer program product of claim 15, wherein the computer readable program code to determine the texture similarity between the first texture descriptors from the first image and the second texture descriptors from each of the transformed images includes computer readable program code configured to perform bidirectional matching where the first texture descriptors from the first image are matched to the second texture descriptors from each of the transformed images, and the second texture descriptors from each of the transformed images are matched to the first texture descriptors from the first image.

20. The computer program product of claim 15, wherein the computer readable program code to detect the first feature points and detecting the second feature points includes computer readable program code configured to use a Scale-Invariant Feature Transform (SIFT) algorithm.

* * * * *